United States Patent
Rudenko (10) Patent No.: US 12,512,714 B2
(45) Date of Patent: Dec. 30, 2025

(54) ELECTRICAL MACHINE WITH AN AXIAL AIR GAP FOR AN AIRCRAFT

(71) Applicant: Rolls-Royce Deutschland Ltd & Co KG, Blankenfelde-Mahlow (DE)

(72) Inventor: Anton Rudenko, Unterhaching (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 265 days.

(21) Appl. No.: 18/208,255

(22) Filed: Jun. 9, 2023

(65) Prior Publication Data

US 2023/0402888 A1    Dec. 14, 2023

(30) Foreign Application Priority Data

Jun. 10, 2022   (DE) .................. 10 2022 205 899.2

(51) Int. Cl.
| | |
|---|---|
| *H02K 1/2793* | (2022.01) |
| *B64D 27/32* | (2024.01) |
| *B64D 27/34* | (2024.01) |
| *H02K 1/04* | (2006.01) |
| *H02K 1/28* | (2006.01) |
| *H02K 21/24* | (2006.01) |

(52) U.S. Cl.
CPC ............ *H02K 1/2793* (2013.01); *B64D 27/32* (2024.01); *B64D 27/34* (2024.01); *H02K 1/04* (2013.01); *H02K 1/28* (2013.01); *H02K 21/24* (2013.01)

(58) Field of Classification Search
CPC ............ H02K 1/22; H02K 21/02; H02K 1/27; H02K 1/28; H02K 1/04

USPC .................. 310/49.22, 156.32, 266–268
See application file for complete search history.

(56) References Cited

U.S. PATENT DOCUMENTS

| | | | |
|---|---|---|---|
| 7,990,011 B2 | 8/2011 | Yoshino et al. | |
| 11,239,716 B2 | 2/2022 | Mihaila et al. | |
| 2009/0096310 A1* | 4/2009 | Takeuchi | H02K 11/215 |
| | | | 310/156.36 |
| 2019/0280575 A1 | 9/2019 | Inomoto et al. | |
| 2021/0284834 A1* | 9/2021 | Slade | C08J 5/249 |

FOREIGN PATENT DOCUMENTS

| | | | | |
|---|---|---|---|---|
| CN | 208596977 U | * | 3/2019 | ........... H01F 7/0273 |
| CN | 112332573 A | | 2/2021 | |
| CN | 216530796 U | | 5/2022 | |
| CN | 114300214 B | * | 9/2022 | |
| DE | 102013219724 A1 | | 4/2015 | |

(Continued)

OTHER PUBLICATIONS

European Office Action for related European Patent Application No. 23178029.7, dated Oct. 27, 2023, pp. 1-8.

*Primary Examiner* — Jose A Gonzalez Quinones
(74) *Attorney, Agent, or Firm* — Lempia Summerfield Katz LLC (57) ABSTRACT

An electric machine (1) having an axial air gap (S), in particular for an aircraft (2), comprising: a stator (10), a rotor (11) that is rotatable relative to the stator (10), at least one permanent magnet (12A-12D) which, on the rotor (11), is held form-fittingly on a base (111) of the rotor (11) by a holding portion (110) of the rotor (11), and a protective layer (13A-13D) which covers a side (120), facing towards the stator (10), of the at least one permanent magnet (12A-12D), wherein the holding portion (110) of the rotor (11) engages over the protective layer (13A-13D).

20 Claims, 4 Drawing Sheets

(56) References Cited

FOREIGN PATENT DOCUMENTS

| | | | |
|---|---|---|---|
| DE | 102015114041 A1 | | 3/2017 |
| EP | 2773023 A1 | | 9/2014 |
| EP | 2802062 A1 | | 11/2014 |
| EP | 3687048 A1 | | 7/2020 |
| FR | 3111244 A1 | | 12/2021 |
| JP | S5892883 U | | 6/1983 |
| JP | 2006087216 A | | 3/2006 |
| JP | 2010142080 A | | 6/2010 |
| JP | 2011055577 A | * | 3/2011 |
| JP | 2015142484 A | | 8/2015 |
| JP | 2020054089 A | * | 4/2020 |
| JP | 20212914 A | | 3/2021 |

* cited by examiner

ELECTRICAL MACHINE WITH AN AXIAL AIR GAP FOR AN AIRCRAFT

The present disclosure relates in particular to an electric machine having an axial air gap for an aircraft, and to an aircraft having such an electric machine.

Aircraft drive arrangements take a variety of forms. Internal combustion engines, for example piston engines or gas turbine engines, allow long ranges and high speeds. Drives having one or more electric motors allow the use of sustainably generated energy and are in some cases particularly low-maintenance and particularly quiet.

In the aviation sector, it is always desired to ensure the highest possible level of safety. The probability of failure of a component should be as low as possible. Should a failure nevertheless occur, the consequences of the failure should be minimized. It is at the same time typically sought to realize a low weight.

U.S. Pat. No. 7,990,011 B2 describes a rotor for an electric motor, in which magnets, an outer ring, a rotor disk and a cover for the magnets are all adhesively bonded together in order to fix the magnets and in order to dampen vibrations. It would however be desirable to provide an even more reliable solution.

U.S. Pat. No. 11,239,716 B2 describes a solution with a large number of very small magnets, which are each accommodated in an associated housing. The resulting reduction of the area occupied by magnetic material can however result in a decrease in efficiency.

It is an object of the present invention to provide an electric machine having an axial air gap, which electric machine is as reliable, and at the same time as efficient, as possible.

According to one aspect, an electric machine having an axial air gap, in particular for an aircraft or some other vehicle, is provided. The electric machine comprises a stator, a rotor that is rotatable relative to the stator, at least one permanent magnet, and a protective layer. The at least one permanent magnet is, on the rotor, held form-fittingly on a base of the rotor by a holding portion of the rotor. The protective layer covers a side, facing towards the stator, of the at least one permanent magnet. Provision is made here for the holding portion of the rotor to engage over the protective layer. The axial air gap is formed between the rotor and the stator.

It is thus made possible that, in the event of destruction, for example in the event of a fracture, of the permanent magnet, the resulting fragments of the permanent magnet are held securely on the base of the rotor without being able to detach from the rotor and cause consequential damage. It is furthermore thus possible to realize a distributed introduction of force between rotor structure and permanent magnet and thus to reduce stress peaks in the brittle magnet material, such that in many cases a fracture of the at least one permanent magnets can even be prevented. Since the holding portion of the rotor engages over the protective layer, a particularly secure fastening of the protective layer is possible, which in turn makes it possible for a gap width between the rotor and the stator to be reduced. In this way, not only can the reliability of the electric machine be increased, but an improvement in the efficiency of the electric machine is also possible despite a simple construction. The electric machine is for example an axial flux machine, a transverse flux machine and/or a hybrid, for example with a radial and axial air gap.

The rotor may comprise a multiplicity of permanent magnets. Here, a single protective layer may cover several or all of the permanent magnets. Furthermore, a separate protective layer may for example be provided for each permanent magnet.

The protective layer comprises, for example, a fibre-reinforced plastics material. This allows a particularly shallow form of the protective layer, whereby the spacing between the one or more permanent magnets and the coils can be kept particularly small. Furthermore, the use of such a material allows particularly good retention of fragments that form in the event of a failure, for example.

Fibres of the protective layer may include carbon fibres, ceramic fibres and/or glass fibres. This allows the at least one permanent magnet to be secured particularly effectively.

The protective layer optionally comprises a (first) ply with fibres. The fibres of the (first) ply may (at least predominantly or all) run perpendicular to an edge of the holding portion. In this way, the fibres can each be fixed to the holding portion and hold the permanent magnet particularly securely.

In one refinement, the protective layer comprises a further (second) ply with fibres. The further (second) ply differs from the (first) ply, for example. For example, the fibres of the ply have a greater stiffness than the fibres of the further ply. The two plies are for example arranged one over the other. The further (second) ply may be arranged between the (first) ply and the permanent magnet. The further (second) ply may in this case primarily secure adjacent regions of the permanent magnet to one another, whilst the (first) ply secures the permanent magnet as a whole to the base.

The protective layer can be made particularly thin owing in particular to the fact that the holding portion engages over it. The protective layer has, for example, a thickness of between 0.01 mm or 0.015 mm and 0.3 mm, in particular of 0.02 mm to 0.14 mm. In particular, a particularly small thickness of 0.01 to 0.05, in particular of 0.015 mm to mm, or generally a thickness of 0.02 mm or less, may be provided. A particularly small spacing between rotor and stator is thus possible.

The protective layer may be areally adhesively bonded, in particular over a full area, to the at least one permanent magnet. Locally formed fragments can thus be secured particularly effectively.

Provision may be made for the protective layer to lie against the at least one permanent magnet along a surface. Provision may furthermore be made for the protective layer to be electrically insulating in a direction perpendicular to said surface. Particularly good electromagnetic characteristics of the electric machine can thus be achieved.

The at least one permanent magnet optionally comprises a neodymium-iron-boron alloy (NdFeB alloy) and/or a samarium-cobalt alloy (SmCo alloy) or consists of the NdFeB alloy and/or the SmCo alloy. These alloys have particularly good mechanical characteristics. NdFeB alloys however typically tend to splinter, leaving sharp edges. SmCo alloys are often very brittle. Therefore, in some fields of use, these alloys cannot be used, or have hitherto been able to be used only with securing measures that at least partially nullify the advantages of the mechanical characteristics. The design of the electric machine described herein enables the magnetic characteristics of such magnets to be particularly well utilized, despite said magnets being securely held.

The base and the holding portion may surround the at least one permanent magnet at at least three sides, for example at a bottom side, at a top site situated opposite the bottom side, and at an end side that connects the top side to the bottom side. This allows a particularly secure form-fitting holding action. The base and the holding portion are optionally formed as a single piece with one another.

Specifically, the base and a projection of the holding portion may enclose the at least one permanent magnet at two opposite sides of the permanent magnet, for example at the top side and the bottom side, in order to securely hold the permanent magnet.

The permanent magnet optionally comprises multiple parts. A further protective layer may be provided and arranged between the two parts. The protective layer and the further protective layer optionally run parallel to one another. This allows fragments to be secured particularly effectively, similarly to the situation in laminated safety glass.

The protective layer optionally forms a scarf joint with the at least one permanent magnet. This allows further improved retention of the permanent magnet by the protective layer. The scarf joint may be formed by a bevel on the permanent magnet, against which the protective layer lies. The scarf joint may be formed in that region of the holding portion where the permanent magnet provides no significant magnetic function in any case.

The at least one permanent magnet may be enclosed at opposite sides by the protective layer and a further protective layer. The protective layer and the further protective layer are optionally materially integrally connected to one another by means of connections that extend through the at least one permanent magnet. This allows a particularly secure holding action.

According to one aspect, an aircraft is provided, comprising a rotor unit, which has rotor blades, and comprising the electric machine according to any embodiment described herein for driving the rotor unit. The rotor unit and the electric machine form a drive system for the aircraft. The drive system serves for generating thrust and/or lift for the aircraft.

Embodiments will now be described by way of example with reference to the figures, in which, in schematic illustrations.

Figure 1:
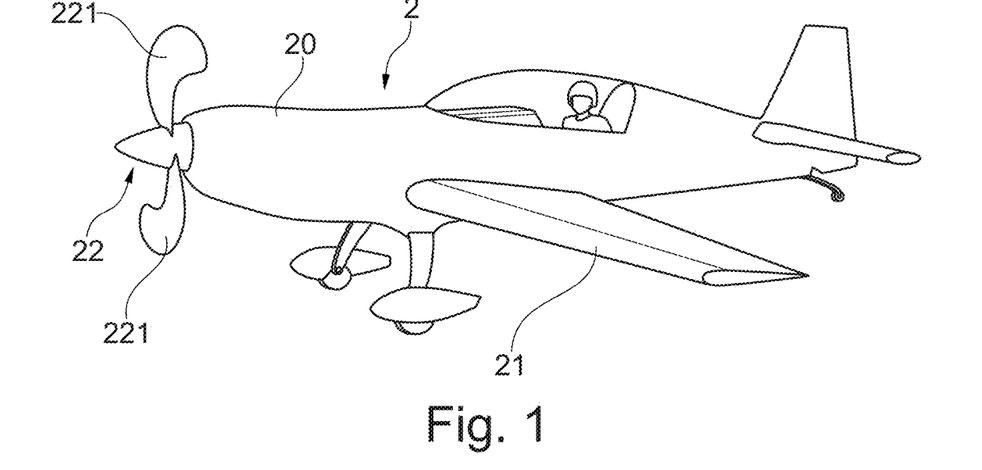
FIG. 1 shows an aircraft in the form of an aeroplane having an electrically driven rotor unit.

FIG. 1 shows an aircraft 2 in the form of an electrically powered aeroplane having a fuselage 20 and wings 21.

The aircraft 2 comprises a drive system having a rotor unit 22 which is driven by an electric machine of the drive system. The rotor unit 22 comprises a plurality of rotor blades 221, in this case two rotor blades 221 by way of example. The rotor blades 221 in the example shown are mounted on a hub, thus forming a propeller. In alternative embodiments, the aircraft 2 comprises, for example, a fan instead of a propeller, and/or comprises multiple drive systems each having at lease one propeller, fan, or the like.

Figure 2:
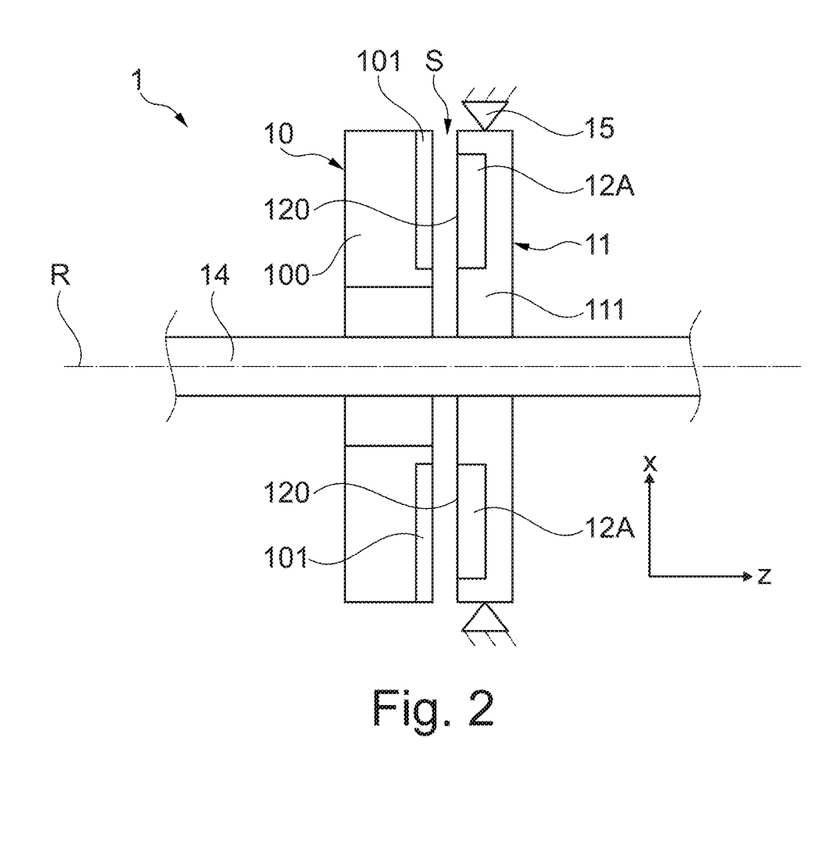
FIG. 2 shows an electric machine of the aircraft according to FIG. 1.

FIG. 2 shows the electric machine 1 of the aircraft 2 in a schematic sectional view. The electric machine 1 is in the form of an electric motor (which is optionally also usable as a generator). The electric machine 1 has an axial air gap (S). Specifically, the electric machine 1 is configured as an axial flux machine and comprises a stator 10, a rotor 11, a shaft 14 and bearing 15. The electric machine 1 is an axial flux motor and can also be referred to as a disc-rotor motor, though this is merely an example and the electric machine 1 may also be configured for example as a transverse flux machine.

The rotor 11 is mounted by means of the bearing 15 so as to be rotatable relative to the stator 10 about an axis of rotation R. The bearing 15 is illustrated here, merely by way of example, in the form of a ball bearing.

The stator 10 is fixedly mounted on a support of the aircraft 2. For example, the stator is fixed relative to the fuselage 20. The stator 10 comprises a body 100 to which multiple electrical coils 101 are fixed. The coils 101 of the stator 10 are for example wound around stator teeth that are formed on or fastened to the body 100.

The rotor 11 comprises a base 111 to which multiple (surface-mounted) permanent magnets 12A are fixed. The permanent magnets 12A are fastened, in pairs with alternating polarity, to the base 111 of the rotor 11. Permanently excited electric machines permit particularly high power densities and torque densities. The base 111 is fixed to the shaft 14. The permanent magnets 12A face towards the coils 101 of the stator 10. Each permanent magnet 12A has a side 120 that faces towards the coils 101 of the stator 10.

An electrical current through the coils 101 generates a magnetic field which sets the rotor 11 in rotation about the axis of rotation R. Formed between the stator 10 and the rotor 11 is the axial air gap S, via which the magnetic forces act between the stator 10 and the rotor 11. Here, magnetic fields bridge the axial air gap S in an axial direction (in a direction parallel to the axis of rotation R). The axial air gap S is generally filled with a gas or a gas mixture, in this case with air. The axial air gap S has the shape of a circular disc. The rotor 11 and the stator 10 are thus separated from one another by the axial air gap S (which is of planar form). The stator 10 and the rotor 11 are spaced apart from one another in an axial direction parallel to the axis of rotation R. The rotor 11 is arranged axially adjacent to the stator 10.

Furthermore, in FIG. 2, an axis parallel to the axis of rotation R is denoted by z. An axis perpendicular to this is denoted by x. In FIG. 2, an axis perpendicular to the axis x and to the axis z corresponds to axis extending perpendicularly into the plane of the image.

The electric machine 1 drives the rotor unit 22 via the shaft 14. For example, the rotor unit 22 is fastened to the shaft or is operatively connected thereto in some other way. The drive system optionally comprises multiple electric machines 1 on the shaft 14.

Figure 3:
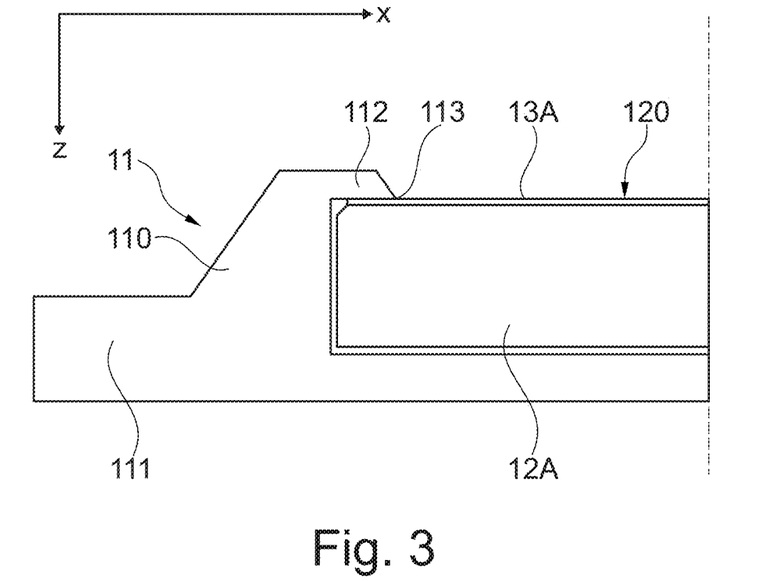
FIG. 3 shows a portion of a rotor of the electric machine according to FIG. 2 with a permanent magnet and with a protective layer.

FIG. 3 shows a detail of the rotor 11 at an edge region of one of the permanent magnets 12A. The permanent magnet 12A extends primarily along the axis x and has a thickness in the direction of the axis z.

The rotor 11 comprises a base 111, on which a holding portion 110 is formed. The at least one permanent magnet 12A is, on the rotor 11, held form-fittingly on the base 111 of the rotor 11 by the holding portion 110 of the rotor 11.

Here, the holding portion 110 engages around the permanent magnet 12A. An edge region of the permanent magnet 12A is arranged between the holding portion 110 and the base 111 and is thus held form-fittingly so as to be prevented from lifting off along the axis z, and is optionally braced force-fittingly between said holding portion and base.

For this purpose, the holding portion comprises a projection 112 which (in the edge region of the permanent magnet 12A) extends along a side 120, facing towards the stator 10, of the permanent magnet 12A (along the axis x). The base 111 and the projection 112 of the holding portion 110 enclose the permanent magnet 12A at two mutually opposite sides of the permanent magnet 12A, specifically the side facing towards the stator 10 (the top side) and the bottom side that is averted from the stator The bottom side of the permanent magnet 12A lies areally on the base 111. The holding portion 110 extends at an end side of the permanent magnet 12A, which end side connects the top side to the bottom side of the permanent magnet 12A. The base 111 and the holding portion 110 (together with projection 112) thus surround the at least one permanent magnet 12A at three sides. FIG. 3 shows one end of the permanent magnet 12A. The other, opposite end may be held on the base 111 in an analogous manner. In this case, the permanent magnet 12A is for example pushed in laterally during the assembly process. Alternatively, a fastening device is provided at the other end.

As shown in FIG. 3, the electric machine 1 furthermore comprises (at least) a protective layer 13A covering that side 120 of the permanent magnet 12A which faces towards the stator 10. In the present case, the protective layer 13A completely covers that side 120 of the permanent magnet 12A which faces towards the stator 10. The protective layer 13A may furthermore also cover adjacent permanent magnets 12A, in particular all of the permanent magnets 12A facing towards the stator 10, of the rotor 11. In the latter case, the protective layer 12A is for example ring-shaped.

Provision is made here for the holding portion 110 of the rotor 11 to also engage over the protective layer 13A. In this way, the protective layer 13A is held particularly securely on the rotor 11 and particularly effectively secures the permanent magnet 12A on said rotor.

In the present case, the protective layer 13A is areally adhesively bonded to the permanent magnet 12A, specifically in particular over the entire area of contact between the protective layer 13A and the permanent magnet 12A.

The permanent magnet 12A is composed of a neodymium-iron-boron alloy. A samarium-cobalt alloy, for example, is alternatively conceivable. Such alloys are difficult to process. The present securing means allows greater production tolerances.

Figure 4:
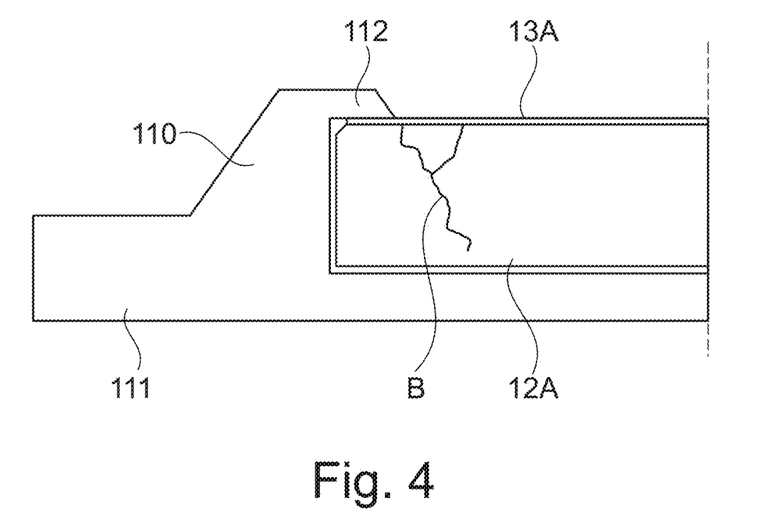
FIG. 4 shows the portion of the rotor of the electric machine according to FIG. 3, the illustration showing a fault involving a broken permanent magnet.

FIG. 4 illustrates a fault situation in which the permanent magnet 12A has a fracture B. A loose fragment has formed as a result of the fracture B. Said fragment is held on the rest of the permanent magnet 12A by the protective layer 13A. Furthermore, the fracture B does not extend all the way through the permanent magnet 12A, because said permanent magnet is supported by the protective layer 13A.

Figure 5:
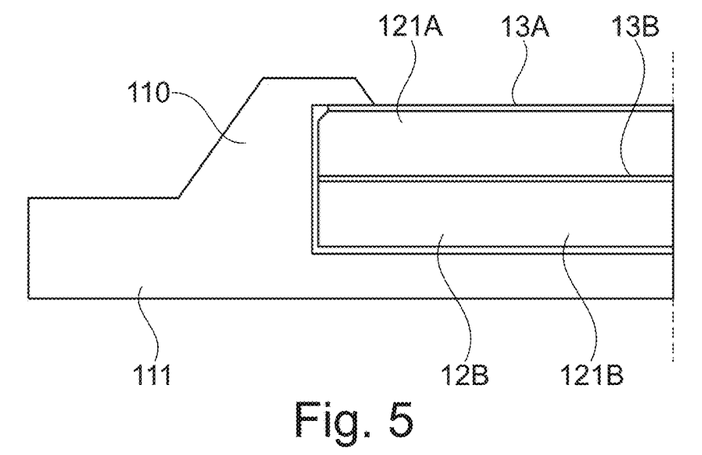
FIG. 5 shows an alternative embodiment of the rotor for the electric machine according to FIG. 2, with multiple protective layers.

FIG. 5 shows a refinement in which, in addition to the protective layer 13A arranged as described above, a further protective layer 13B is provided on the permanent magnet 12A. Here, the permanent magnet 12A is of two-part form, that is to say comprises two parts 121A, 121B. Here, a first part 121A faces towards the stator 10, and a second part 121B is averted from the stator 10. The further protective layer 13B extends between the two parts 121A, 121B. The further protective layer 13B is adhesively bonded over a full area to the two parts 121A, 121B of the permanent magnet 12A. The operating principle is therefore similar to that of laminated safety glass. The permanent magnet 12A, as a magnet assembly with the two parts 121A, 121B, is secured particularly effectively in the event of a fracture.

The protective layer 13A and the further protective layer 13B run parallel to one another.

Figure 6:
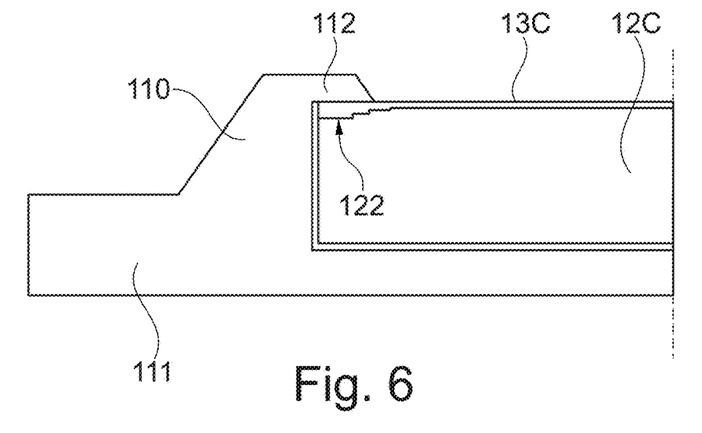
FIG. 6 shows a further alternative embodiment of the rotor for the electric machine according to FIG. 2, with a protective layer forming a scarf joint with a permanent magnet.

FIG. 6 shows an embodiment in which the permanent magnet 12A has a bevel 122 in the edge region under the projection 112. Said bevel may be of inclined or stepped form. The protective layer 13C fills the space that is left free by the bevel 122. The protective layer 13C thus has a thickened portion under the projection 112. The material thickness of the protective layer 13C is greater in the region of the bevel 122 than in a region of the protective layer 13C which is spaced apart from the projection 112 (and from the bevel 122).

The protective layer 13C thus forms a scarf joint with the permanent magnet 12C. This allows the protective layer 13C to be held particularly securely in the edge region of the protective layer 13C and of the permanent magnet 12C. The protective layer 13C can thus be held particularly firmly on the permanent magnet 12C and can thus secure said permanent magnet particularly effectively.

Figure 7:
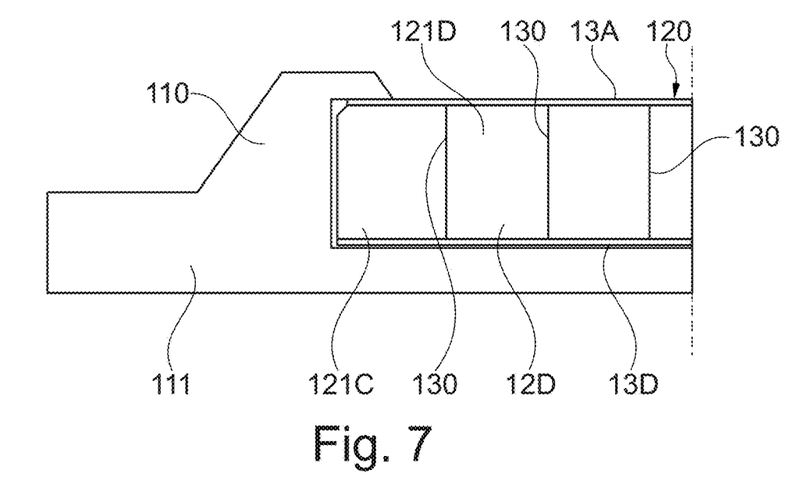
FIG. 7 shows a further alternative embodiment of the rotor for the electric machine according to FIG. 2, with a permanent magnet being enclosed between two protective layers.

FIG. 7 shows an embodiment in which a further protective layer 13D is provided on that side (in this case the bottom side) of the permanent magnet 12D which is averted from the side 120, facing towards the stator 10, of the permanent magnet 12D. The permanent magnet 12D is thus enclosed at opposite sides by the protective layer 13A and the further protective layer 13D.

Furthermore, the protective layer 13A and the further protective layer 13D are (optionally) materially integrally connected to one another by means of connections 130 that extend through the at least one permanent magnet 12D. The connections 130 extend areally between in each case two parts 121C, 121D of the permanent magnet 12D in the form of a magnet assembly. Alternatively or in addition, connections 130 may extend through bores in the permanent magnet 12D.

This sandwich structure allows the permanent magnet 12D to be secured particularly effectively.

Figure 8:
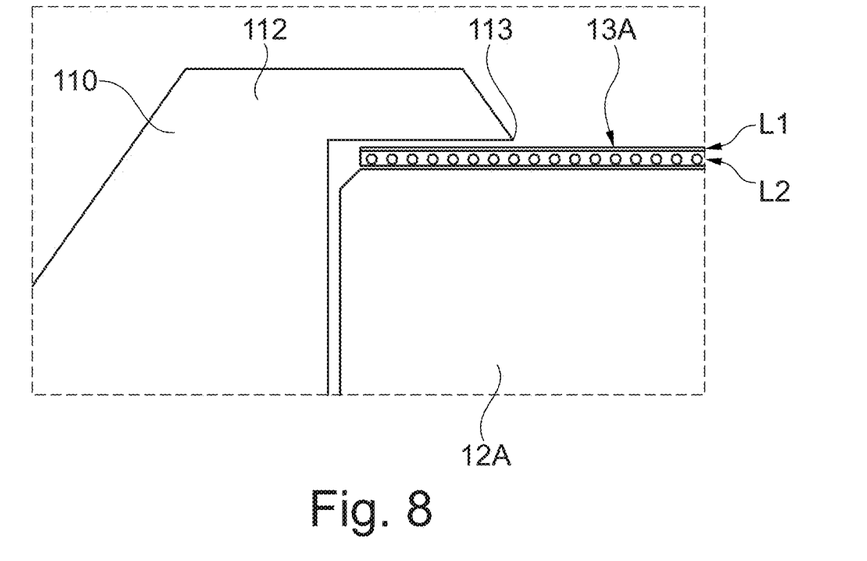
FIG. 8 shows a detail view of an edge region of the permanent magnet on the rotor according to FIG. 3.

FIG. 8 shows the edge region of the permanent magnet 12A from FIG. 3 in detail, and illustrates details of the protective layer 13A. Note that the other protective layers 13B-13D described herein may also be constructed in the same way.

In the present case, the protective layer 13A comprises a fibre-reinforced plastics material. The plastics material is for example a thermoplastic or a thermoset. The fibres are for example carbon fibres and/or ceramic fibres (or alternatively or additionally glass fibres).

It is illustrated here that the protective layer 13A may have a multi-layer structure. In the present case, the protective layer comprises an upper ply L1 with fibres that run perpendicular to an edge 113 of the holding portion 110 (specifically of the projection 112 of the holding portion 110). Said fibres thus proceeded perpendicularly from the edge 113. Alternatively, an angled orientation is conceivable, though provision may in particular be made for the fibres or upper layer to run at an angle with respect to the edge 113, not parallel thereto.

In the present case, the protective layer 13A comprises a further, lower ply L2 with fibres. The fibres of the upper ply L1 have a greater stiffness than the fibres of the lower ply L2. Pressures can thus be distributed particularly effectively. The fibres of the lower ply L2 are oriented differently than the fibres of the upper ply L1, for example at an angle with respect thereto (for example at right angles). In the present case, all of the fibres of the plies L1, L2 of the protective layer 13A run parallel to the top side of the permanent magnet 12A, that is to say in the present case in the plane perpendicular to the axis z.

The protective layer 13A lies against the permanent magnet 12A along a surface, and is electrically insulating in a direction perpendicular to said surface. This is possible for example by way of the stated orientation of the fibres (and/or by means of electrically insulating fibres) in conjunction with an electrically insulating plastics matrix.

The protective layer 13A is for example in the form of a film. The protective layer 13A has (in particular throughout, possibly other than in an edge region) a thickness of less than 0.3 mm, in particular less than 0.14 mm, in particular less than 0.02 mm. In the present case, the protective layer 13A has (in particular throughout, possibly other than in an edge region) a thickness of 0.015 mm. By virtue of the fact that the protective layer 13A is clamped on the permanent magnet 12A by the holding region 110 (together with projection 112), a reliable and robust holding action is possible even with this particularly small thickness of the protective layer 13A.

The rotor 11 of the described embodiments is particularly robust and particularly well protected against defects, and thus allows a long service life and at the same time particularly high efficiency.

LIST OF REFERENCE SIGNS

1 Electric machine
10 Stator
100 Body
101 Coil
11 Rotor
110 Holding portion
111 Base
112 Projection
12A-12D Permanent magnet
120 Side
121A-121D Part
122 Bevel
13A-13D Protective layer
130 Connection
14 Shaft
15 Bearing
2 Aircraft
20 Fuselage
21 Wing
22 Rotor unit
221 Rotor blade
B Fracture
L1, L2 Ply
R Axis of rotation
S Axial air gap

The invention claimed is:

1. An electric machine having an axial air gap, the electric machine comprising:
a stator;
a rotor that is rotatable relative to the stator;
at least one permanent magnet that, on the rotor, is held form-fittingly on a base of the rotor by a holding portion of the rotor, the at least one permanent magnet having a first side that faces towards the stator, a second side opposite the first side, and a third side that extends between the first side and the second side; and
a protective layer that covers the first side of the at least one permanent magnet,
wherein the holding portion of the rotor engages over the protective layer that covers the first side of the at least one permanent magnet, and part of the holding portion of the rotor is opposite the third side of the at least one permanent magnet.

2. The electric machine of claim 1, wherein the protective layer comprises a fiber-reinforced plastics material.

3. The electric machine of claim 2, wherein fibers of the protective layer comprise carbon fibers, ceramic fibers, glass fibers, or any combination thereof.

4. The electric machine of claim 1, wherein the protective layer comprises a ply with fibers extending perpendicular to an edge of the holding portion.

5. The electric machine of claim 4, wherein the protective layer comprises a further ply with fibers, and
wherein the fibers of the ply have a greater stiffness than the fibers of the further ply.

6. The electric machine of claim 1, wherein the protective layer has a thickness of 0.02 mm or less.

7. The electric machine of claim 1, wherein the protective layer is areally adhesively bonded to the at least one permanent magnet.

8. The electric machine of claim 1, wherein the protective layer lies against the at least one permanent magnet along a surface, and is electrically insulating in a direction perpendicular to the surface.

9. The electric machine of claim 1, wherein the at least one permanent magnet comprises or consists of a neodymium-iron-boron alloy, a samarium-cobalt alloy, or the neodymium-iron-boron alloy and the samarium-cobalt alloy.

10. The electric machine of claim 1, wherein the base and the holding portion surround the at least one permanent magnet at at least three sides.

11. The electric machine of claim 1, wherein the base and a projection of the holding portion surround the at least one permanent magnet at two opposite sides of a permanent magnet of the at least one permanent magnet.

12. The electric machine of claim 1, wherein a permanent magnet of the at least one permanent magnet comprises multiple parts,
wherein a further protective layer is arranged between the multiple parts, and
wherein the protective layer and the further protective layer run parallel to one another.

13. The electric machine of claim 1, wherein the protective layer forms a scarf joint with the at least one permanent magnet.

14. The electric machine of claim 1, wherein the at least one permanent magnet is enclosed at opposite sides by the protective layer and a further protective layer, and
wherein the protective layer and the further protective layer are materially integrally connected to one another by connections that extend through the at least one permanent magnet.

15. An aircraft comprising:
a rotor unit that comprises rotor blades; and
an electric machine for driving the rotor unit, the electric machine having an air gap and comprising:
a stator;
a rotor that is rotatable relative to the stator;
at least one permanent magnet that, on the rotor, is held form-fittingly on a base of the rotor by a holding portion of the rotor, the at least one permanent magnet having a first side that faces towards the stator, a second side opposite the first side, and a third side that extends between the first side and the second side; and a protective layer that covers the first side of the at least one permanent magnet, wherein the holding portion of the rotor engages over the protective layer that covers the first side of the at least one permanent magnet, and part of the holding portion of the rotor is opposite the third side of the at least one permanent magnet.

16. The aircraft of claim 15, wherein the protective layer comprises fiber-reinforced plastics material.

17. The aircraft of claim 16, wherein fibers of the protective layer comprise carbon fibers, ceramic fibers, glass fibers, or any combination thereof.

18. The aircraft of claim 15, wherein the protective layer comprises a ply with fibers extending perpendicular to an edge of the holding portion.

19. The electric machine of claim 1, wherein the electric machine is for an aircraft.

20. The electric machine of claim 13, wherein the scarf joint is formed by a bevel on the at least one permanent magnet, against which the protective layer is positioned.

\* \* \* \* \*